(12) United States Patent
Brosse et al.

(10) Patent No.: US 7,931,728 B2
(45) Date of Patent: Apr. 26, 2011

(54) FERTILIZER GRANULES AND MANUFACTURING PROCESS

(75) Inventors: Jacques Brosse, La Grand Croix (FR); Stephane Delheur, Saint Georges Haute Ville (FR); Eric Philibert, La Talaudiere (FR)

(73) Assignee: SNF S.A.S., Saint Etienne (FR)

( * ) Notice: Subject to any disclaimer, the term of this patent is extended or adjusted under 35 U.S.C. 154(b) by 393 days.

(21) Appl. No.: 11/573,181

(22) PCT Filed: Jul. 20, 2005

(86) PCT No.: PCT/FR2005/050598
§ 371 (c)(1),
(2), (4) Date: Feb. 2, 2007

(87) PCT Pub. No.: WO2006/021708
PCT Pub. Date: Mar. 2, 2006

(65) Prior Publication Data
US 2007/0245786 A1    Oct. 25, 2007

(30) Foreign Application Priority Data

Aug. 6, 2004 (FR) ..................................... 04 51805

(51) Int. Cl.
*C05D 9/02* (2006.01)
*C05F 11/00* (2006.01)
*C05C 9/00* (2006.01)
*C05B 15/00* (2006.01)
*A01N 25/00* (2006.01)
*A01N 25/12* (2006.01)

(52) U.S. Cl. ........ 71/30; 71/11; 71/27; 71/29; 71/64.02; 71/64.03; 504/116.1; 504/367

(58) Field of Classification Search ................ 71/11, 27, 71/29, 30, 64; 504/116.1, 358, 367
See application file for complete search history.

(56) References Cited

U.S. PATENT DOCUMENTS

| | | | |
|---|---|---|---|
| 3,223,518 A * | 12/1965 | Hansen | 71/64.07 |
| 4,055,974 A * | 11/1977 | Jackson, Jr. | 71/11 |
| 5,019,564 A * | 5/1991 | Lowe et al. | 514/75 |
| 5,047,078 A * | 9/1991 | Gill | 71/11 |
| 6,900,162 B2 * | 5/2005 | Wertz et al. | 504/367 |
| 2004/0009878 A1 | 1/2004 | Lynch et al. | |
| 2004/0069032 A1 | 4/2004 | Krysiak et al. | |

FOREIGN PATENT DOCUMENTS

| | | |
|---|---|---|
| DE | 40 40 771 C1 | 7/1992 |
| DE | 43 13 671 A1 | 10/1994 |
| EP | 0 255 752 A | 2/1988 |
| JP | 57135790 A | 8/1982 |
| JP | 11335662 A | 12/1999 |
| WO | 97/07675 A | 3/1997 |

* cited by examiner

*Primary Examiner* — Jerry Lorengo
*Assistant Examiner* — Jennifer A Smith
(74) *Attorney, Agent, or Firm* — Heslin Rothenberg Farley & Mesiti P.C.

(57) ABSTRACT

A fertilizer granule contains, as a binder, at least one organic polymer. The organic polymer is a hydrosoluble polymer that is at least partially cationic.

19 Claims, No Drawings

FERTILIZER GRANULES AND MANUFACTURING PROCESS

CROSS REFERENCE TO RELATED APPLICATIONS

This is a Section 371 filing of International Application PCT/FR2005/050598, filed on Jul. 20, 2005, and published, in French, as International Publication No. WO 2006/021708 A1 on Mar. 2, 2006, and claims priority of French Application No. 0451805, filed on Aug. 6, 2004, which applications are hereby incorporated by reference herein, in their entirety.

BACKGROUND ART

The present invention relates to the technical field of fertilizers in general and more especially fertilizer compounds in the form of granules and their manufacturing process.

Fertilizers are organic or mineral plant nutrients intended to increase or maintain the fertility of plant life in particular by providing them with plant food elements such as nitrogen, potassium, phosphorous, calcium, magnesium, sulphur etc. as well as trace elements.

Conventionally, in order to facilitate their use and preservation, fertilizers are often produced in granular form.

In most cases, the process used to obtain granular fertilizers uses agglomeration without compression, referred to as wet granulation. This granulation technique is intended to convert materials that are, generally speaking, powdery into small pellets.

Agglomeration is obtained by feeding into an agitator (of the drum granulator or plate granulator type) firstly the powdery powder (or a mixture of solids) and secondly a small quantity of a liquid which is generally water. The effect of this is to cause the particles to stick together, thus forming agglomerates which assume a spherical shape as they roll and rub against each other.

Of the numerous factors that characterise the granules and the effectiveness of the granulation operation, the main factors are the size of the particles and the size distribution as well as the hardness of the granules obtained.

Conventionally, various additives are often used, including binders that are intended to reduce the quantity of water used and hence the cost of drying.

The main binders used to produce granular fertilizers include:
- sulphuric acid which is corrosive and poses problems in terms of storage hazards,
- bentonite which must be used in large quantities (of the order of 10%) which reduce the proportion of active ingredient accordingly,
- or cellulose derivatives such as carboxymethyl cellulose (CMC) which are relatively expensive.

Document DE 40 40 771 describes fertilizer particles consisting of a core comprising an organic material of natural origin consisting of wood and grape cake mixed with natural hydrosoluble polymers of the pectin or alginate type. The core is then encapsulated in gelatine. The proposed product is not a granule obtained by wet granulation but is equivalent to particles obtained by encapsulation. In addition, all the polymers mentioned are anionic polymers and the Applicant has observed that they were either impossible to use in a granulation process or have to be used in quantities that reduce the proportion of the active ingredient.

Document EP-A-255 752 describes fertilizer granules coated in a composition based on 3-hydroxy-3-alkylpropionic acid used as an antimicrobial agent in the presence of polymers that are capable of accelerating or retarding dissolution of said antimicrobial agent. Given their function, the polymers are polymers that are not soluble in water and not used as a binder but are used in order to retard release of the antimicrobial agent to a greater or lesser extent.

Document US 2004/009878 describes fertilizer pellets that include, as a binder, synthetic organic polymers such as polyacrylamide. These polymers are anionic polymers with the same disadvantages as those mentioned above.

The present invention intends to overcome these deficiencies.

BRIEF SUMMARY OF THE INVENTION

The object of the invention is fertilizer granules that contain, as a binder, at least one organic polymer characterised in that said organic polymer is a hydrosoluble polymer which is at least partially cationic.

In practice, the cationic polymer has a molecular weight in excess of 10,000, preferably in excess of 50,000 or even 100,000.

More precisely, according to the invention, it has surprisingly been found that it is possible, by using a hydrosoluble cationic organic polymer as a binder during a wet granulation operation for fertilizer compounds, to obtain granules of the desired size and uniformity whilst overcoming the difficulties of conventional processes.

In the rest of this description, the term "polymer which is at least partially cationic" denotes:
- a polymer which is totally cationic, i.e. of the (homo) polymer type comprising at least two cationic monomers
- a partially ionic polymer, i.e. a polymer of the copolymer type comprising at least one cationic monomer and one or more other non-ionic and/or anionic comonomers.

If the polymer is partially cationic, the cationic monomers represent at least 30 mol % of the polymer.

The cationic monomers are advantageously selected from the group comprising salts of diallyldialkyl ammonium such as diallyldimethyl ammonium chloride (DADMAC) and dialkylaminoalkyl acrylates and methacrylates, especially dialkylaminoethyl acrylate (ADAME) and dialkylaminoethyl methacrylate (MADAME) as well as their salts acidified or quaternized with means that are familiar to those skilled in the art such as benzyl chloride, methyl chloride (MeCl), aryl chlorides, alkyl chlorides, dimethylsulphate and even dialkylaminoalkyl acrylamides or methacrylamides and their salts acidified or quaternized in a known manner, e.g. methacryloylaminopropyltrimethylammonium chloride (MAPTAC) and Mannich products such as quaternized dialkylaminomethyl acrylamides.

Convenient comonomers can be:
- non ionic such as, for example, those selected from the group comprising acrylamide, methacrylamide, N-vinylmethylacetamide or N-vinylformamide, vinylacetate, vinylpyrrolidone, methyl methacrylate or other acrylic esters or other ethylenically unsaturated esters or even other vinyl monomers that are not soluble in water such as styrene or acrylonitrile,
- and/or anionic. By way of example, monomers that have a carboxylic function (e.g. acrylic acid, methacrylic acid and their salts etc.), monomers that have a sulphonic acid function (e.g. 2-acrylamido-2-methylpropane sulphonic acid (AMPS) and their salts etc.) etc.

In one preferred embodiment, the binder comprises at least one cationic homopolymer or copolymer based on salts of diallyldialkyl ammonium, preferably DADMAC.

The cationic organic polymers may also be selected from the group comprising polyethylene imine, polyvinylamine, epichlorohydrin-based polyamine, dicyandiamide resin, formaldehyde melamine resin.

The polymers that can be used according to the invention are well known per se, as are their synthesis routes.

These include the following, merely by way of example:
polymerisation in solution
reverse emulsion polymerisation (water in oil) which may or may not be followed by spray drying
polymerisation in gel with subsequent grinding of the gel in order to obtain a powder directly
polymerisation in UV light
aqueous dispersions of water-soluble polymers, also referred to as water-in-water dispersions or water-in-water emulsions
reverse suspension polymerisation which makes it possible to obtain polymers in the form of beads, etc.

According to the invention, the cationic organic polymers used can be linear or branched.

As is known, a polymer is branched when a branching agent is used during or after polymerisation in association or not in association with a transfer agent. Merely by way of example, the branching agents that one can use comprise ionic branching agents such as polyvalent metal salts, formaldehyde, glyoxal or even, preferably, covalent cross-linking agents that will copolymerise with the monomers, preferably polyethylenically unsaturated monomers (having at least two non saturated functions), such as, for example, vinyl, allyl, acrylic and epoxy functions (such as, for example, methylene-bis-acrylamide (MBA). In practice, the branching agent is introduced at a rate of five to one thousand (5 to 1,000) moles per million of moles of monomer, preferably 5 to 200.

According to one highly preferred embodiment of the general process of the invention, the polymers are in the form of an aqueous solution having an acid pH (pH<7), preferably a pH less than 5.

The object of the invention is also the use of the polymer which is at least partially cationic and described above as a binder in the fertilizer granules.

During the granulation process, generally speaking, the polymer is introduced either wholly or partly during initial mixing with the fertilizer material or wholly or partly in the granulator.

The invention therefore also relates to the process for producing granular fertilizers described above, a process whereby a mixture comprising the fertilizer and the binder is produced by wet granulation.

In one particular embodiment, all or part of the mixture is previously prepared dry, i.e. all the powder is mixed dry before granulation.

It should be noted that the invention relates not only to the association by mixing of cationic (co)polymer(s) with fertilizer materials but also the new physical structure of these granules created by introducing specific proportions of the polymer before and/or during the granulation process.

The invention also relates to:
firstly fertilizer granules that contain, in their structure, from 0.01 to 0.5% by weight, preferably 0.03 to 0.2% by weight, of a cationic organic polymer as defined above
secondly a process for manufacturing these granules based on the known manufacturing process for granular fertilizers but which involves introducing, at the wet granulation stage, at least one cationic organic polymer at a rate of 0.01 to 0.5% by weight, preferably 0.03 to 0.2% by weight.

After reading this patent application, those skilled in the art will be able to select the best combination by choosing the required polymer and quantity in line with their own knowledge and/or with the aid of routine tests.

Commonly granulated fertilizer materials or fertilizers include, for example, ammoniacal derivatives (N) (such as ammonium sulphate, ammonium nitrate, urea, etc.), phosphates (P), derivatives of potassium (K) or complex fertilizers (NPK, NP, NK, PK) etc.

DETAILED DESCRIPTION

The invention and its resulting advantages will become more apparent from the following examples.

EXAMPLES

The following tests describe granulation tests performed on a single complex fertilizer depending on the binders used without limiting the scope of the invention in any way.

Equipment: a mixer, a plate granulator and a dryer
Fertilizer material: organo-mineral type with the formulation NPK 5-7-9 and comprising 56% lignite by weight
Abbreviation: AM: acrylamide; AA Na: sodium acrylate; MADAME+: trimethylaminoethyl methacrylate chloride.
Particle size distribution is tested by using screens of different sizes.

The purpose of testing the strength of the granules is to measure their crushing strength. It involves recording a maximum pressure applied to granules of identical size before they deform (breaking point).

Interpretation of results: 2: very good; 1: good; 0: satisfactory; −1: unsatisfactory.

A/Use of Binder in Solid Form:
Method:
weigh out the necessary quantities of fertilizer(s)
weigh out the defined quantity of binder
pre-mix the binder and fertilizers and homogenise
transfer the mixture to the granulator: agglomeration is obtained by spraying water or steam onto the mixture, approximately 14% by weight, until beads having a satisfactory particle size are obtained (special note: some of the water can be incorporated during the pre-mixing stage).

The granules obtained are then pre-dried by using a paint burner and then transferred to an oven at 50° C. for 12 hours.

COMPARISON TABLE 1

| | Binder in solid form (powder (a) or beads (b)) | | | | |
|---|---|---|---|---|---|
| | Binder: chemical composition in mol % (molecular weight) | Granulation | Homogeneity | Hardness | Proportion of (dry) polymer in kg/T of fertilizer material |
| 1 | AA Na 100 (3,000,000) | NO | — | — | 1 |
| 2 | AM/AA Na 30/70 (3,000,000) | NO | — | — | 1 |
| 3 | AA/AA Na 70/30 (3,000,000) | NO | — | — | 1 |
| 4 | Bentonite | YES | 0 | −1 | 5 |
| 5 | Bentonite | YES | 1 | 1 | 10 |
| 6 | Bentonite | NO | — | — | 1 |

COMPARISON TABLE 1-continued

Binder in solid form (powder (a) or beads (b))

|  | Binder: chemical composition in mol % (molecular weight) | Granulation | Homogeneity | Hardness | Proportion of (dry) polymer in kg/T of fertilizer material |
|---|---|---|---|---|---|
| 7a* | MADAME + 100 (1,000,000) | YES | 2 | 1 | 1 |
| 8a* | AM/MADAM + 40/60 *3,000,000) | YES | 1 | 0 | 1 |
| 9a* | AM/MADAME + 70/30 (3,000,000) | YES | 0 | 0 | 1 |
| 10b* | DADMAC 100 (100,000) | YES | 1 | 1 | 1 |
| 11b* | AM/DADMAC 40/60 (500,000) | YES | 1 | 0 | 1 |

*tests that relate to the invention

B/Use of a Binder in Liquid Form
Method:
  weigh out the necessary quantities of fertilizers
  prepare a dilute solution of polymer with 0.15% of the active ingredient
  spray the polymer on the fertilizer material at a rate of 3% by weight of dilute solution
  transfer the mixture to the granulator Agglomeration is obtained by spraying water or steam onto the mixture at a rate of approximately 7% by weight until beads having a satisfactory particle size are obtained (special note: some of the water can be incorporated before this stage).

COMPARISON TABLE 2

Binder used in liquid form

|  | Binder: chemical composition in mol % (molecular weight) [pH] | Granulation | Homogeneity | Hardness | Proportion of (dry) polymer in kg/T of fertilizer material |
|---|---|---|---|---|---|
| 12 | AA Na 100 (20,000) | NO | — | — | 0.45 |
| 13 | AA/AA Na 70/30 (100,000) | NO | — | — | 0.45 |
| 14c* | MADAME + 100 (20,000) [3] | YES | 1 | 1 | 0.45 |
| 15c | MADAME + 100 (5,000) [3] | NO | — | — | 0.45 |
| 16* | AM/MADAME + 50/50 (300,000) [3] | YES | 1 | 0 | 0.45 |
| 17* | AM/MADAME + 70/30 (300,000) [3] | YES | 0 | 0 | 0.45 |
| 18* | AM/MADAME + 80/20 (300,000) [3] | YES | −1 | −1 | 0.45 |
| 19* | DADMAC 100 (100,000) [6] | YES | 1 | 1 | 0.45 |
| 20* | DADMAC pH = 3 | YES | 2 | 2 | 0.45 |

COMPARISON TABLE 2-continued

Binder used in liquid form

|  | Binder: chemical composition in mol % (molecular weight) [pH] | Granulation | Homogeneity | Hardness | Proportion of (dry) polymer in kg/T of fertilizer material |
|---|---|---|---|---|---|
|  | 100 (100,000) [3] |  |  |  |  |
| 21* | AM/DADMAC 40/60 (500,000) [3] | YES | 1 | 0 | 0.45 |
| 22* | Polyamine (dimethyl amine + epichlorohydrine) (80,000) [5] | YES | 1 | 0 | 0.45 |

*tests that relate to the invention

By way of comparison, using sulphuric acid as a binder gives the following results (continuously added in the plate granulator).

|  | Binder: 80% active aqueous solution | Granulation | Homogeneity | Hardness | Proportion of acid in kg/T of fertilizer material |
|---|---|---|---|---|---|
| 23 | Sulfuric acid | YES | 1 | 2 | 10 |
| 24 | Sulphuric acid | NO | — | — | 5 |

CONCLUSION

As can be seen, the results obtained using the cationic organic polymers according to the invention fully meet industrial requirements. In fact, it is clearly apparent that at the recommended dosage, only the latter develop optimum granulation capacity (the granules are hard and homogeneous).

In addition, observation of the various granules produced shows that the effect of molecular weight, if it exceeds 10,000, is not significant. Nevertheless, cationicity greater than 30 mol % is required in order to achieve effective granulation.

At the same time, it is surprisingly apparent that if the pH of the polymer solution is highly acid, the granules obtained are more homogeneous and their hardness is improved.

The invention claimed is:

1. A homogeneous fertilizer granule containing a mixture of a fertilizer and at least one hydrosoluble organic polymer binder that is at least partially cationic, wherein the hydrosoluble organic polymer binder includes at least one structural unit derived from a cationic monomer, the structural units derived from said cationic monomer representing greater than 30 mol % of said hydrosoluble organic polymer binder; and wherein said hydrosoluble organic polymer binder represents from 0.01 to 0.5% by weight of said granule.

2. A granule as claimed in claim 1, wherein the hydrosoluble organic polymer binder that is at least partially cationic is of a homopolymer or copolymer type comprising a structural unit derived from at least one cationic monomer and, optionally, from structural units derived from one or more other non-ionic and/or anionic comonomers.

3. A granule as claimed in claim 2, wherein the cationic monomer is selected from the group consisting of diallyldimethyl ammonium chloride (DADMAC), salts of dialkylaminoethyl acrylate (ADAME), including quaternized salts thereof, salts of dialkylaminoethyl methacrylate (MADAME), including quaternized salts thereof, and methacrylamidopropyltrimethylammonium chloride (MAPTAC).

4. A granule as claimed in claim 2, wherein the non-ionic comonomer is selected from the group consisting of acrylamide, methacrylamide, N-vinylmethylacetamide, N-vinylformamide, vinyl acetate, vinylpyrrolidone, methyl methacrylate, styrene, and acrylonitrile.

5. A granule as claimed in claim 2, wherein the anionic monomer is selected from the group consisting of acrylic acid, methacrylic acid, 2-acrylamido-2-methylpropane sulphonic acid (AMPS) and their salts.

6. A granule as claimed in claim 1, wherein the hydrosoluble organic polymer binder that is at least partially cationic is selected from the group consisting of polyethylene imine, polyvinylamine, epichlorohydrine-based polyamine, dicyandiamide resin, and melamine formaldehyde resin.

7. A granule as claimed in claim 1, wherein the hydrosoluble organic polymer binder that is at least partially cationic is a DADMAC-based cationic homopolymer or copolymer.

8. A process for manufacturing a fertilizer granule of claim 1 wherein the mixture comprising the fertilizer and the hydrosoluble organic polymer binder is wet granulated.

9. A process as claimed in claim 8, wherein all or part of the mixture is previously prepared dry.

10. A granule as claimed in claim 1, wherein the hydrosoluble organic polymer binder that is at least partially cationic represents from 0.03 to 0.2% by weight of said granule.

11. A process for forming fertilizer granules according to claim 1, said process comprising:
forming a mixture containing defined quantities of a fertilizer material and a hydrosoluble, at least partially cationic, organic binder polymer that includes at least one structural unit derived from a cationic monomer;
homogenizing said mixture; and
subjecting said homogenized mixture to conditions effective for forming said fertilizer granules.

12. The process according to claim 11, comprising:
forming a mixture of said fertilizer and said organic binder polymer both in dry form;
homogenizing said mixture; and
subjecting said homogenized mixture to water or steam under conditions effective for forming said fertilizer granules.

13. The process according to claim 11, comprising:
spraying particles of said fertilizer in dry form with an aqueous solution of said organic binder polymer, thereby forming a mixture of said fertilizer and said organic binder polymer; and
subjecting said mixture to conditions effective for forming said fertilizer granules.

14. The process according to claim 11, wherein said fertilizer particles are formed using a granulator.

15. A granule as claimed in claim 1, wherein structural units derived from the cationic monomers represent at least 60 mol % of the hydrosoluble organic polymer binder.

16. A granule as claimed in claim 15, wherein structural units derived from the cationic monomers represent 100 mol % of the hydrosoluble organic polymer binder.

17. A granule as claimed in claim 1, wherein said hydrosoluble organic polymer binder has a molecular weight greater than 20,000, and the structural units derived from said cationic monomer comprise 100 mol % of said hydrosoluble organic polymer binder.

18. A process as claimed in claim 8, wherein the hydrosoluble organic polymer which is at least partially cationic is in the form of an aqueous solution having a pH less than 7.

19. A process as claimed in claim 18, wherein the hydrosoluble organic polymer which is at least partially cationic is in the form of an aqueous solution having a pH less than 5.

* * * * *